(12) United States Patent
Murakami et al.

(10) Patent No.: US 10,005,442 B2
(45) Date of Patent: Jun. 26, 2018

(54) BRAKE CONTROL DEVICE (71) Applicant: HITACHI AUTOMOTIVE SYSTEMS, LTD., Ibaraki (JP)

(72) Inventors: Shoh Murakami, Saitama (JP); Yasufumi Konishi, Kanagawa (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days. days.

(21) Appl. No.: 15/297,318

(22) Filed: Oct. 19, 2016

(65) Prior Publication Data
US 2017/0036659 A1 Feb. 9, 2017

Related U.S. Application Data (63) Continuation-in-part of application No. 13/626,345, filed on Sep. 25, 2012, now abandoned.

(30) Foreign Application Priority Data

Sep. 29, 2011 (JP) ................. 214599/2011

(51) Int. Cl.
B60T 7/04 (2006.01)
B60T 13/74 (2006.01)
(Continued)

(52) U.S. Cl.
CPC ............ B60T 13/745 (2013.01); B60T 7/042 (2013.01); B60T 13/166 (2013.01); B60T 13/662 (2013.01); B60T 13/686 (2013.01)

(58) Field of Classification Search
CPC ....... B60T 13/686; B60T 7/042; B60T 8/3655
(Continued)

(56) References Cited

U.S. PATENT DOCUMENTS 6,193,330 B1 2/2001 Soga et al.
6,325,471 B1 12/2001 Curran et al.
(Continued)

FOREIGN PATENT DOCUMENTS

JP 6-127317 5/1994
JP 06127317 5/1994
(Continued)

OTHER PUBLICATIONS

Office Action dated Apr. 15, 2015 in corresponding Japanese Patent Application No. 2011-214599 with English translation.

Primary Examiner — Thomas W Irvin
(74) Attorney, Agent, or Firm — Wenderoth, Lind & Ponack, L.L.P.

(57) ABSTRACT

With the use of electric power supplied from a vehicle power source, an electric motor is controlled based on a movement amount of an input rod by a master-pressure control device. A primary piston is thrust through an intermediation of a ball-screw mechanism to generate brake fluid pressure in a master cylinder. The brake fluid pressure generated by the master cylinder is fed-back by an input piston through an intermediation of the input rod to a brake pedal. When system end conditions such as the OFF state of the ignition switch are satisfied, the master-pressure control device executes power-supply interruption control to interrupt the vehicle power source and supply necessary electric power from an auxiliary power source, to thereby continue brake control with electric power stored in the auxiliary power source.

20 Claims, 7 Drawing Sheets (51) Int. Cl.
*B60T 13/68* (2006.01)
*B60T 13/16* (2006.01)
*B60T 13/66* (2006.01)

(58) Field of Classification Search
USPC .... 303/113.4, 115.2, 122.04, 122.05, 122.07
See application file for complete search history.

(56) References Cited

U.S. PATENT DOCUMENTS

| | | | | |
|---|---|---|---|---|
| 7,540,572 | B2* | 6/2009 | Nakamura | B60T 8/36 303/119.2 |
| 8,506,020 | B2* | 8/2013 | Nishino | B60T 1/10 303/122.04 |
| 8,827,378 | B2* | 9/2014 | Toyohira | B60T 7/06 303/113.4 |
| 9,831,814 | B2* | 11/2017 | Ajima | H02P 27/08 |
| 2006/0163939 | A1 | 7/2006 | Kuramochi et al. | |
| 2011/0316329 | A1 | 12/2011 | Nishino et al. | |

FOREIGN PATENT DOCUMENTS

| | | |
|---|---|---|
| JP | 2000-16258 | 1/2000 |
| WO | 2010/113574 | 10/2010 |

\* cited by examiner

BRAKE CONTROL DEVICE

CROSS-REFERENCE TO RELATED APPLICATIONS

This is a continuation-in-part application of a U.S. patent application Ser. No. 13/626,345, filed Sep. 25, 2012, which is incorporated by reference herein in its entirety and to which priority is claimed.

BACKGROUND OF THE INVENTION

1. Technical Field

The present invention relates to a brake control device which is actuated by using an electric motor as a driving source.

2. Description of the Related Art

For example, as described in International Publication No. WO2010/113574, as a brake control device for an automobile, there is a brake control device for generating a servo force by using an electric motor as a driving source in accordance with an operation of a brake pedal, which is performed by a driver, to perform braking.

It is desired that the brake control device for an automobile can be actuated even when an ignition switch is in an OFF state. Therefore, in the electric brake control device described above, even though the ignition switch is turned OFF to bring a control system into a shutdown state, it is desired that the control system be started to allow the actuation of the brake control device when, for example, the operation of the brake pedal is detected or a state, in which there is a possibility of the operation of the brake pedal due to opening/closure of a door or the like, is indirectly detected. When the system is started as described above, however, a certain length of time is required to start the system. Therefore, a problem of responsiveness occurs. On the other hand, in view of reduction in power consumption, it is not desired to maintain a startup state of the brake system over a long period of time while the ignition switch is in the OFF state.

SUMMARY OF THE INVENTION

The present invention has an object to provide a brake control device which can be quickly actuated even when an ignition switch is in an OFF state while reducing a load on a power source.

In order to achieve the above-mentioned object, according to an exemplary embodiment of the present invention, there is provided a brake control device, including: an electric actuator for controlling a braking force of a brake device provided to a vehicle; and control means for controlling the electric actuator to be driven by electric power supplied from a vehicle power source. The control means is further connected to an auxiliary power source; and the control means executes power-supply interruption control for interrupting the connection to the vehicle power source and continuing the control of the electric actuator by electric power supplied from the auxiliary power source when predetermined system end conditions are satisfied.

Further, according to another exemplary embodiment of the present invention, there is provided a brake control device, including: a master-pressure control mechanism for generating, by an electric actuator, a brake fluid pressure to be supplied to a brake device provide to a vehicle; and control means for controlling the master-pressure control mechanism based on an operation amount of a brake pedal provided to the vehicle and an actuation state of the electric actuator. The control means is connected to a vehicle power source and an auxiliary power source for driving the electric actuator; and the control means executes power-supply interruption control for interrupting the connection to the vehicle power source and continuing the control of the master-pressure control mechanism by electric power supplied from the auxiliary power source when predetermined system end conditions are satisfied.

Further, according to still another exemplary embodiment of the present invention, there is provided a brake control device, including: a master-pressure control mechanism for generating, by an electric actuator, a brake fluid pressure to be supplied to a brake device provide to a vehicle; and control means for controlling the master-pressure control mechanism based on an operation amount of a brake pedal provided to the vehicle and an actuation state of the electric actuator. The control means is connected to a vehicle power source and an auxiliary power source for driving the electric actuator; the control means includes a power-source failure detection section for monitoring a voltage of the vehicle power source to detect a failure of the vehicle power source; and the control means executes power-supply interruption control for interrupting the connection to the vehicle power source and continuing the control of the master-pressure control mechanism by electric power supplied from the auxiliary power source when predetermined system end conditions are satisfied or when the failure of the vehicle power source is detected by the power-source failure detection section.

The brake control device according to the present invention can be quickly actuated even when the ignition switch is in the OFF state while reducing the load on the vehicle power source.

DETAILED DESCRIPTION OF THE INVENTION

Figure 1:
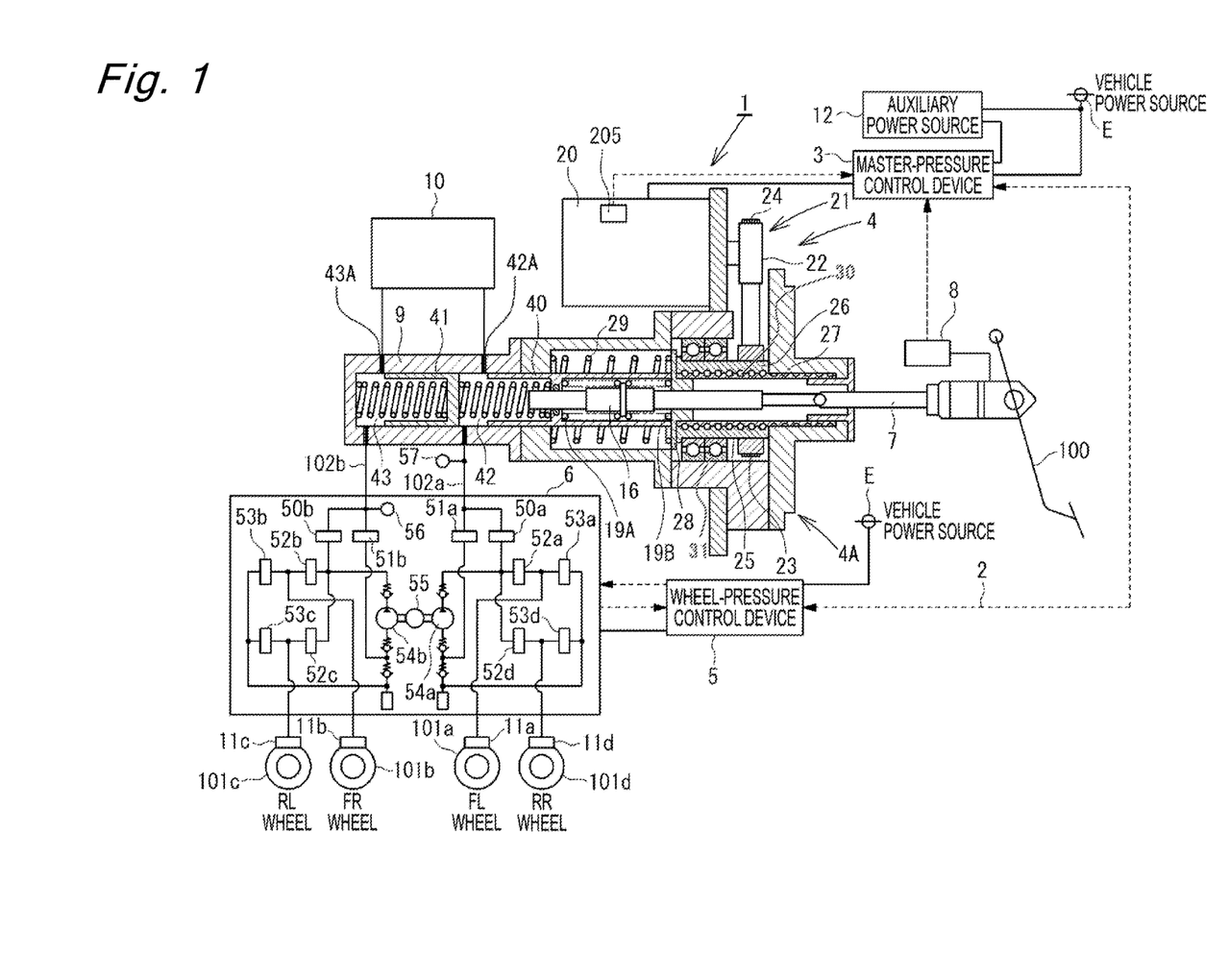
FIG. 1 is a block diagram illustrating a schematic configuration of a brake control device according to embodiments of the present invention.

In the following, embodiments of the present invention are described in detail with reference to the drawings. FIG.

1 is a block diagram illustrating an overall system configuration of a brake control device 1 according to the embodiments of the present invention. In FIG. 1, arrowed broken lines indicate signal lines. The orientation of the arrow indicates the flow of a signal. The brake control device 1 is applied to a braking device for an automobile, which is a vehicle, so as to control a braking force on each of four wheels, that is, a front left wheel FL, a rear right wheel RR, a front right wheel FR, and a rear left wheel RL.

The brake control device 1 includes a master-pressure control mechanism 4, a master-pressure control device 3, a wheel-pressure control mechanism 6, a wheel-pressure control device 5, an input rod 7, a brake operation-amount detection device 8, a master cylinder 9, a reservoir tank 10, a vehicle power source E, and an auxiliary power source 12. The master-pressure control mechanism 4 includes an electric motor 20 for controlling a master pressure corresponding to a brake fluid pressure generated by the master cylinder 9. The master-pressure control device 3 is control means for electrically controlling the master-pressure control mechanism 4. The wheel-pressure control mechanism 6 supplies the brake fluid pressure to hydraulic brake devices 11a to 11d corresponding to brake devices for the wheels FL, RR, FR, and RL, respectively. The wheel-pressure control device 5 electrically controls the wheel-pressure control mechanism 6.

Each of the hydraulic brake devices 11a to 1d includes a cylinder, a piston, and brake pads (all not shown). The piston of each of the hydraulic brake devices 11a to 1d is thrust by the brake fluid pressure supplied from the wheel-pressure control mechanism 6. The pair of brake pads is pressed against a corresponding one of disc rotors 101a to 101d so as to interpose the corresponding disc rotor therebetween by the thrust of the piston. The disc rotors 101a to 101d rotate integrally with the wheels. By pressing a corresponding one of the disc rotors 101a to 101d against the pair of brake pads, a frictional braking force is generated to allow a brake torque to act thereon, which then becomes a braking force acting between a corresponding one of the wheels and a road surface.

The master cylinder 9 is a tandem-type master cylinder which includes two pressurizing chambers, that is, a primary fluid-chamber 42 and a secondary fluid-chamber 43. The primary fluid-chamber 42 is to be pressurized by a primary piston 40 and an input piston described below. The secondary fluid-chamber 43 is to be pressurized by a secondary piston 41. In the master cylinder 9, by the thrust of the primary piston 40, the secondary piston 41 is also thrust. As a result of the thrust of the two pistons, the brake fluid is pressurized in the primary fluid-chamber 42 and the secondary fluid-chamber 43. The pressurized brake fluid passes through a primary pipe 102a and a secondary pipe 102b to be supplied to the hydraulic brake devices 11a to 11b for the respective wheels FL, RR, FR, and RL through the wheel-pressure control mechanism 6, thereby generating the braking force described above.

The reservoir tank 10 is connected to the primary fluid-chamber 42 and the secondary fluid-chamber 43 through reservoir ports 42A and 43A. The reservoir ports 42A and 43A are opened when the primary piston 40 and the secondary piston 41 are in backward positions to bring the primary fluid-chamber 42 and the secondary fluid-chamber 43 into communication with the reservoir tank 10 so as to appropriately replenish the primary fluid-chamber 42 and the secondary fluid-chamber 43 with the brake fluid, respectively. On the other hand, when the primary piston 40 and the secondary piston 41 move forward, the reservoir ports 42A and 43A are closed to block the primary fluid-chamber 42 and the secondary fluid-chamber 43 from the reservoir tank 10 so as to enable the pressurization of the primary fluid-chamber 42 and the secondary fluid-chamber 43, respectively.

As described above, the brake fluid is supplied to two-system hydraulic circuits through the primary pipe 102a and the secondary pipe 102b by the two pistons, that is, the primary piston 40 and the secondary piston 41. With this configuration, even when one of the hydraulic circuits fails, the fluid pressure can be supplied by the other one of the hydraulic circuits. Therefore, the braking force can be ensured.

The master-pressure control mechanism 4 includes an input piston 16 which passes through a central portion of the primary piston 40 so as to be slidable and in a fluid-tight state. The input piston 16 is arranged so that a distal end thereof is exposed in the primary fluid-chamber 42. The input rod 7 is coupled to a rear end of the input piston 16. The input rod 7 is extended externally from the rear end of the master-pressure control mechanism 4 into a driver's cabin of the vehicle. A brake pedal 100 is coupled to the extended end of the input rod 7. A pair of springs 19A and 19B is interposed between the primary piston 40 and the input piston 16. The primary piston 40 and the input piston 16 are elastically retained in balanced positions by spring forces of the springs 19A and 19B. The spring forces of the springs 19A and 19B act in accordance with a relative displacement between the primary piston 40 and the input piston 16 in an axial direction.

The master-pressure control mechanism 4 includes the electric motor 20, a ball-screw mechanism 25, and a belt speed-reduction mechanism 21. The electric motor 20 is an electric actuator for driving the primary piston 40. The ball-screw mechanism 25 is a rotary-to-linear conversion mechanism and the belt speed-reduction mechanism 21 is a speed-reduction mechanism. The ball-screw mechanism 25 and the speed-reduction mechanism are provided between the primary piston 40 and the electric motor 20. The electric motor 20 includes a rotational-position sensor 205 for detecting a rotational position of the electric motor 20. The rotational-position sensor 205 is actuated in response to a rotational-position command from the master-pressure control device 3 so as to be driven to move to a desired rotational position. As the electric motor 20, for example, a known DC motor, DC brushless motor, or AC motor can be used. In this embodiment, a three-phase DC brushless motor is used in view of controllability, quietness, and durability. Moreover, the amount of thrust of the ball-screw mechanism 25, that is, a displacement amount of the primary piston 40 can be calculated based on the signal from the rotational-position sensor 205.

The ball-screw mechanism 25 includes a screw shaft 27, a nut member 26, and a plurality of balls (steel balls) 30. The screw shaft 27 is a hollow linearly-moving member into which the input rod 7 is inserted. The nut member 26 is a cylindrical rotational member into which the screw shaft 27 is inserted. The plurality of balls 30 are provided in screw grooves formed between the screw shaft 27 and the nut member 26. A front end of the nut member 26 abuts on a rear end of the primary piston 40 through an intermediation of a movable member 28. In this manner, the nut member 26 is rotatably supported by a bearing 31 provided to a housing 4A. The ball-screw mechanism 25 rotates the nut member 26 by the electric motor 20 through an intermediation of the belt speed-reduction mechanism 21. In this manner, the balls 30 roll inside the screw grooves to linearly move the screw shaft 27 so as to press the primary piston 40 through an intermediation of the movable member 28. The screw shaft 27 is biased by a return spring 29 through an intermediation of the movable member 28 toward a backward position.

As the rotary-to-linear conversion mechanism, another mechanism such as a rack-and-pinion mechanism may be used as long as the mechanism converts rotary movement of the electric motor 20 (that is, the belt speed-reduction mechanism 21) into linear movement so as to transmit the linear movement to the primary piston 40. In this embodiment, the ball-screw mechanism 25 is used in view of a small amount of play, efficiency, and durability. The ball-screw mechanism 25 has back-drivability, and therefore can rotate the nut member 26 by the linear movement of the screw shaft 27. The screw shaft 27 abuts on the primary piston 40 from behind so that the primary piston 40 can separate from the screw shaft 27 to move forward alone. In this manner, even when the actuation of the electric motor 20 is disabled by wire disconnection or the like during the operation of the brake, that is, in a state in which the brake fluid pressure is generated in the master cylinder 9, the screw shaft 27 is returned to the backward position by the spring force of the return spring 29. Therefore, the fluid pressure in the master cylinder 9 can be cancelled so as to prevent brake dragging. Moreover, the primary piston 40 can be separated from the screw shaft 27 to move alone. Thus, when the actuation of the electric motor 20 is disabled, the input piston 16 can be moved forward by the brake pedal 100 through an intermediation of the input rod 7 and be then brought into abutment on the primary piston 40 so as to directly operate the primary piston 40. In this manner, the fluid pressure can be generated to maintain a braking function.

The belt speed-reduction mechanism 21 reduces the speed of the rotation of an output shaft of the electric motor 20 at a predetermined speed-reduction ratio to transmit the rotation at the reduced speed to the ball-screw mechanism 25. The belt speed-reduction mechanism 21 includes a driving pulley 22, a driven pulley 23, and a belt 24. The driving pulley 22 is mounted to the output shaft of the electric motor 20. The driven pulley 23 is mounted to an outer circumferential portion of the nut member 26 of the ball-screw mechanism 25. The belt 24 is provided between and is looped around the driving pulley 22 and the driven pulley 23. The belt speed-reduction mechanism 21 may be combined with another speed-reduction mechanism such as a gear speed-reduction mechanism. In place of the belt speed-reduction mechanism 21, a known gear speed-reduction mechanism, chain speed-reduction mechanism, differential speed-reduction mechanism, or the like can be used. When a sufficiently large torque is obtained by the electric motor 20, the speed-reduction mechanism may be omitted so that the ball-screw mechanism 25 is directly driven by the electric motor 20. In this manner, various problems relating to reliability, quietness, and mountability, which occur due to the intermediation of the speed-reduction mechanism, can be suppressed.

The brake operation-amount detection device 8 is coupled to the input rod 7. The brake operation-amount detection device 8 can detect at least the position or a displacement amount (stroke) of the input rod 7. As a physical amount used for detecting the brake operation amount by the displacement sensor, the displacement amount of the input rod 7, the amount of stroke of the brake pedal 100, an angle of movement of the brake pedal 100, the pedaling force on the brake pedal 100, or the combination of a plurality of pieces of the sensor information described above may be used.

The brake operation-amount detection device 8 may include a plurality of position sensors including the displacement sensor for the input rod 7 and a force sensor for detecting the pedaling force applied by the driver on the brake pedal 100. Specifically, the brake operation-amount detection device 8 may have a configuration in which a plurality of the displacement sensors for the input rod 7 are combined, a configuration in which a plurality of pedaling-force sensors for detecting the pedaling force on the brake pedal 100 are combined, or a configuration in which the displacement sensor and the pedaling-force sensor are combined. With the configuration described above, even when a signal from one of the sensors cannot be received, a braking request by the driver is detected and recognized by the remaining sensor(s). Therefore, fail-safety is ensured. Electric power supply and signal input processing are performed by the wheel-pressure control device 5 for at least one of the sensors included in the brake operation-amount detection device 8, whereas electric power supply and signal input processing are performed by the master-pressure control device 3 for the remaining sensor(s). In this manner, even when a CPU failure or a power-source failure occurs in one of the master-pressure control device 3 and the wheel-pressure control device 5, the braking request by the driver is detected and recognized by the remaining sensor(s) and control device. Therefore, the fail-safety is ensured. Although only one brake operation-amount detection device 8 is illustrated in FIG. 1, two brake operation-amount detection devices to be respectively connected to the master-pressure control device 3 and the wheel-pressure control device 5 may be provided.

Next, control performed by the master-pressure control device 3 on the master-pressure control mechanism 4 is described. The master-pressure control device 3 is actuated by electric power supplied from the vehicle power source E which is a main battery for driving a vehicle light, an audio system, and the like, which are mounted in the vehicle, so as to control the electric motor 20 based on an operation amount of the brake, which corresponds to a value detected by the brake operation-amount detection device 8. The vehicle power source E herein refers to a vehicle battery and a vehicle power-generator (alternator). Specifically, for the conventional automobiles, the vehicle power source E is the vehicle power-generator and the battery. On the other hand, for hybrid automobiles or electric automobiles, the vehicle power source E is a DC/DC converter for converting a voltage of a high-voltage power supply to a voltage of a low-voltage power supply such as a 12V power supply or a 24V power supply, and a low-voltage battery.

The electric motor 20 is actuated to control the position of the primary piston 40 so as to generate the fluid pressure based on the operation amount (the displacement amount, the pedaling force, or the like) of the brake pedal 100, which is detected by the brake operation-amount detection device 8. At this time, the fluid pressure acting on the input piston 16 is fed-back as a reaction force to the brake pedal 100 through the input rod 7. Then, a boost ratio corresponding to a ratio of the operation amount of the brake pedal 100 and a generated fluid pressure can be adjusted by a pressure-receiving area ratio of the primary piston 40 and the input piston 16 and a relative displacement therebetween. At this time, a force in accordance with the master pressure acts on the brake pedal 100 through the input rod 7 so as to be transmitted to the driver as a brake-pedal reaction force. Therefore, a device for generating the brake-pedal reaction force is not additionally required. As a result, the brake control device 1 can be reduced in size as well as in weight to improve the mountability of the brake control device 1 in the vehicle.

For example, the primary piston 40 is displaced so as to follow the displacement of the input piston 16. Then, relative-displacement control is performed so that the relative displacement between the input piston 16 and the primary piston 40 becomes zero. In this manner, a given boost ratio determined by the pressure-receiving area ratio of the input piston 16 and the primary piston 40 can be obtained. Moreover, the displacement of the input piston 16 is multiplied by a proportional gain to change the relative displacement between the input piston 16 and the primary piston 40. In this manner, the boost ratio can be changed.

In this manner, so-called brake-assist control can be executed. Specifically, the need of emergency braking is detected based on the operation amount of the brake pedal 100, an operating speed (a rate of change in the operation amount) of the brake pedal 100, and the like to increase the boost ratio so as to quickly obtain a needed braking force (fluid pressure). Further, regenerative cooperative control can also be executed. Specifically, the boost ratio is adjusted based on a signal from a regenerative braking system (not shown) so that the fluid pressure obtained by subtracting the fluid pressure for regenerative braking is generated at the time of regenerative braking. A desired braking force is obtained by the sum of the fluid pressure for regenerative braking and the braking force obtained by the fluid pressure. Further, automatic brake control can also be executed. Specifically, the electric motor 20 is actuated to move the primary piston 40 regardless of the operation amount of the brake pedal 100 (the displacement amount of the input piston 16) so that the braking force is generated. In this manner, the braking force is automatically adjusted based on a vehicle state detected by various sensor means. The control is appropriately combined with other types of vehicle control such as engine control and steering control. As a result, vehicle-operation control such as vehicle-following control, lane departure avoidance control, and obstacle avoidance control can be executed by using the master-pressure control mechanism 4.

Next, the amplification of the thrust of the input rod 7 is described.

By displacing the primary piston 40 in accordance with the displacement amount of the input piston 16 through an intermediation of the input rod 7 by the braking operation performed by the driver, the thrust of the primary piston 40 is applied in accordance with the thrust of the input rod 7. Therefore, the primary fluid-chamber 42 is pressurized so as to amplify the thrust of the input rod 7. An amplification ratio (hereinafter referred to as "boost ratio") can be arbitrarily set by the relative displacement between the input rod 7 and the primary piston 40 and a ratio of a sectional area of the input piston 16 to that of the primary piston 40.

In particular, in the case where the primary piston 40 is displaced by the same amount as the displacement amount of the input rod 7 (in the case where the relative displacement between the input rod 7 and the primary piston 40 is set to 0), when the sectional area of the input piston 16 is represented by "AI" and the sectional area of the primary piston 40 is represented by "AA", the boost ratio is uniquely determined by: (AI+AA)/AI. Specifically, by setting AI and AA based on a required boost ratio and then controlling the primary piston 40 so that the displacement amount of the primary piston 40 becomes equal to the displacement amount of the input piston 16, a given boost ratio can be constantly obtained. The displacement amount of the primary piston 40 can be calculated based on the output signal from the rotational-position sensor 205.

Next, processing for executing a boost-ratio variable function is described. Boost-ratio variable control processing is control processing for displacing the primary piston 40 by the amount obtained by multiplying the displacement amount of the input piston 16 by a proportional gain (K1). The proportional gain K1 is desired to be 1 in view of controllability. However, when a large braking force exceeding the operation amount of the brake, which is performed by the driver, is required for emergency braking or the like, the proportional gain may be temporarily changed to a value exceeding 1. In this manner, the spring forces of the springs 19A and 19B act with respect to the relative displacement between the input piston 16 and the primary piston 40 to adjust the reaction force acting on the input piston 16. In this manner, even with the same brake operation amount, the master pressure can be increased as compared with that during a normal operation (when K1=1). Therefore, a larger braking force can be generated. The occurrence of emergency braking can be determined based on, for example, whether or not a temporal change rate of the signal from the brake operation-amount detection device 8 exceeds a predetermined value.

As described above, according to the boost-ratio variable control processing, the master pressure is increased or reduced in accordance with the displacement amount of the input rod 7 in response to the braking request by the driver. Therefore, the braking force as requested by the driver can be generated. Moreover, by setting the proportional gain K1 to a value smaller than 1, the boost-ratio variable control processing can be applied to the regenerative cooperative brake control for reducing the pressure of hydraulic braking by the amount of regenerative braking force in a so-called hybrid vehicle or electric automobile.

Next, processing for executing an automatic braking function is described. Automatic-braking control processing is processing for moving the primary piston 40 forward and backward so as to adjust a working pressure of the master cylinder 9 to a requested fluid pressure for automatic braking (hereinafter referred to as "automatic-braking request fluid pressure"). As a method of controlling the primary piston 40 in this case, there are a method involving extracting the displacement amount of the primary piston 40, for realizing the automatic-braking request fluid pressure, based on the relationship between the displacement amount of the primary piston 40 and the master pressure, which is previously obtained as a table, and setting the extracted displacement amount as a target value, a method involving feeding back the master pressure detected by master-pressure sensors 56 and 57, and the like. Any of the methods may be used. The automatic-braking request fluid pressure can be received from an external unit and can be used for, for example, the brake control in the vehicle-following control, the lane departure avoidance control, the obstacle avoidance control, and the like.

Next, a configuration and actuation of the wheel-pressure control mechanism 6 are described. The wheel-pressure control mechanism 6 includes gate-OUT valves 50a and 50b, gate-IN valves 51a and 51b, IN valves 52a to 52d, OUT valves 53a to 53d, pumps 54a and 54b, an electric motor 55, and the master-pressure sensor 56. The gate-OUT valves 50a and 50b control the supply of the brake fluid pressurized by the master cylinder 9 to the respective hydraulic brake devices 11a to 11d. The gate-IN valves 51a and 51b control the supply of the brake fluid pressurized by the master cylinder 9 to the pumps 54a and 54b. The IN valves 52a to 52*d* control the supply of the brake fluid from the master cylinder 9 or the pumps 54*a* and 54*b* to the respective hydraulic brake devices 11*a* to 11*d*. The OUT valves 53*a* to 53*d* perform pressure-reduction control on the respective hydraulic brake devices 11*a* to 11*d*. The pumps 54*a* and 54*b* boost the brake fluid pressure generated by the master cylinder 9. The electric motor 55 drives the pumps 54*a* and 54*b*. The master-pressure sensor 56 detects the master pressure. As the wheel-pressure control mechanism 6, a fluid-pressure control unit for anti-lock brake control, a fluid-pressure control unit for vehicle-behavior stabilization control, or the like can be used.

The wheel-pressure control mechanism 6 includes two brake systems. Specifically, a first brake system is supplied with the brake fluid from the primary fluid-chamber 42 to control the braking forces of the wheels FL and RR. A second brake system is supplied with the brake fluid from the secondary fluid-chamber 43 to control the braking forces of the wheels FR and RL. With the use of the above-mentioned configuration, even when one of the brake systems fails, the braking forces for two diagonally-located wheels can be ensured by the other normal brake system. Thus, a vehicle behavior can be stably maintained.

The gate-OUT valves 50*a* and 50*b* are provided between the master cylinder 9 and the IN valves 52*a* to 52*d*, respectively, and are opened when the brake fluid pressurized by the master cylinder 9 is to be supplied to the hydraulic brake devices 11*a* to 11*d*. The gate-IN valves 51*a* and 51*b* are provided between the master cylinder 9 and the pumps 54*a* and 54*b*, respectively, and are opened when the brake fluid pressurized by the master cylinder 9 is to be boosted by the pumps 54*a* and 54*b* so as to be supplied to the hydraulic brake devices 11*a* to 11*d*.

The IN valves 52*a* to 52*d* are provided upstream of the hydraulic brake devices 11*a* to 11*d*, respectively, and are opened when the brake fluid pressurized by the master cylinder 9 or the pumps 54*a* and 54*b* is to be supplied to the hydraulic brake devices 11*a* to 11*d*. The OUT valves 53*a* to 53*d* are provided downstream of the hydraulic brake devices 11*a* to 11*d*, respectively, and are opened when the wheel pressure is to be reduced. The gate-OUT valves, the gate-IN valves, the IN valves, and the OUT valves are all electromagnetic valves which are opened and closed by the energization of a solenoid (not shown). Moreover, the amount of opening/closing of each of the valves can be independently adjusted by current control performed by the wheel-pressure control device 5.

The gate-OUT valves 50*a* and 50*b* and the IN valves 52*a* to 52*d* are normally-open valves, whereas the gate-IN valves 51*a* and 51*b* and the OUT valves 53*a* to 53*d* are normally-closed valves. With the above-mentioned configuration, even when the electric power supply to the valves is stopped in a case of a failure, the gate-IN valves 51*a* and 51*b* and the OUT valves 53*a* to 53*d* are closed and the gate-OUT valves 50*a* and 50*b* and the IN valves 52*a* to 52*d* are opened, and hence the brake fluid pressurized by the master cylinder 9 reaches all the hydraulic brake devices 11*a* to 11*d*. Therefore, the braking force as requested by the driver can be generated.

When a pressure higher than the working pressure of the master cylinder 9 is required for performing, for example, the vehicle-behavior stabilization control, the automatic-braking control, or the like, the pumps 54*a* and 54*b* boost the master pressure and then supply the boosted master pressure to the hydraulic brake devices 11*a* to 11*d*. As each of the pumps 54*a* and 54*b*, a plunger pump, a trochoid pump, a gear pump, or the like can be used. However, the gear pump is desired in view of quietness.

The electric motor 55 is operated by the electric power supplied based on a control command from the wheel-pressure control device 5 to drive the pumps 54*a* and 54*b* coupled to the electric motor 55. As the electric motor 55, a DC motor, a DC brushless motor, an AC motor, or the like can be used. However, the DC motor is desired in view of quietness.

The master-pressure sensor 56 is provided downstream of the secondary pipe 102*b*, and is a pressure sensor for detecting the master pressure. The number of the master-pressure sensors 56 and the location where the master-pressure sensor 56 is provided can be arbitrarily determined in consideration of controllability, fail-safety, and the like.

Then, the actuation of the above-mentioned wheel-pressure control mechanism 6 is controlled by the wheel-pressure control device 5. The wheel-pressure control device 5 is operated by the electric power supplied from the vehicle power source E to calculate target braking forces to be generated for the respective wheels FL, RR, FR, and RL based on vehicle state amounts so as to control the wheel-pressure control mechanism 6 based on the calculated values. The wheel-pressure control mechanism 6 receives the brake fluid pressurized by the master cylinder 9 to control the brake fluid pressures to be supplied to the hydraulic brake devices 11*a* to 11*d* for the respective wheels FL, RR, FR, and RL in accordance with the output of the wheel-pressure control device 5, thereby executing various types of brake control.

The various types of brake control include, for example, braking-force distribution control for appropriately distributing the braking force to the respective wheels in accordance with a ground-contact load or the like at the time of braking, anti-lock brake control for automatically adjusting the braking forces for the respective wheels at the time of braking so as to prevent the wheels from being locked, vehicle-stability control for suppressing understeering and oversteering to stabilize the vehicle behavior by detecting lateral sliding of the wheels in a running state to automatically apply the braking force to the respective wheels as appropriate, hill start aid (HSA) control for maintaining a braked state on a hill (uphill, in particular) to aid the start, traction control for preventing the wheels from spinning at the time of start or the like, vehicle-following control for keeping a constant distance from a leading vehicle, lane departure avoidance control for keeping running on a driving lane, and obstacle avoidance control for avoiding the collision with an obstacle.

In a case of a failure of the master-pressure control device 3, the wheel-pressure control mechanism 6 detects the brake operation amount performed by the driver based on the brake fluid pressure detected by the master-pressure sensor 56 and controls the pumps 54*a* and 54*b* so as to generate the wheel pressures in accordance with the detected value. In this manner, the braking function of the brake control device 1 can be maintained.

The master-pressure control device 3 and the wheel-pressure control device 5 perform bi-directional communication, and share a control command and the vehicle state amounts. The vehicle state amounts are values or data indicating, for example, a yaw rate, a longitudinal acceleration, a lateral acceleration, a rudder angle, a wheel speed, a vehicle-body speed, failure information, an actuation state, and the like.

The auxiliary power source 12 is capable of storing electric power when a voltage of the power supply line from the vehicle power source E is larger than a predetermined voltage, and supplying the electric power to the master-pressure control device 3 in a case of a failure of the vehicle power source E. In view of reliability, a capacitor such as an electric double-layer capacitor is used as the auxiliary power source 12. As the auxiliary power source 12, a small battery or a vehicle power source of another system may also be used. In any case, the auxiliary power source 12 can supply a small amount of electric power as compared with the vehicle power source E which is fundamentally a main power source for supplying the electric power to the master-pressure control device 3.

Figure 2:
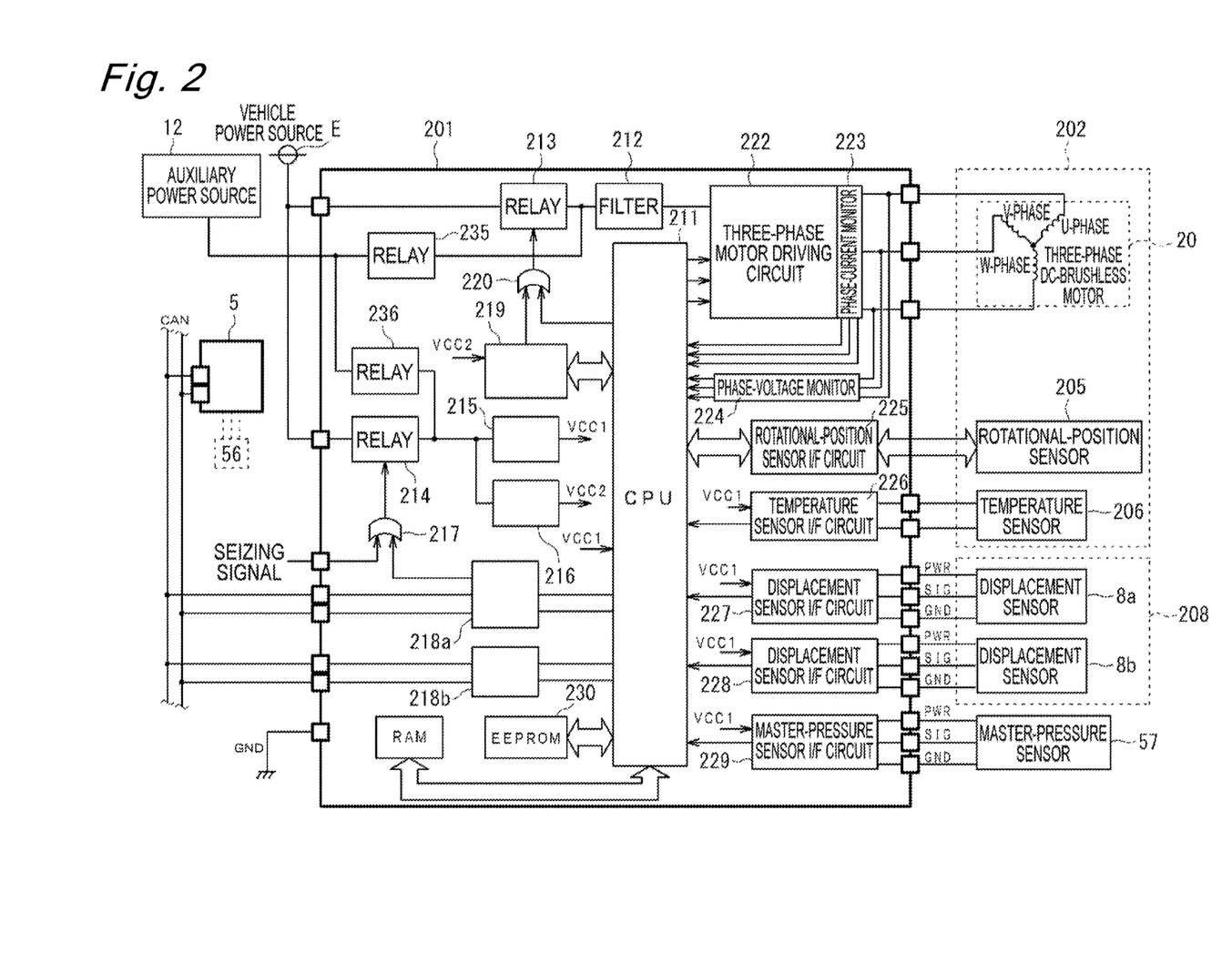
FIG. 2 is a circuit diagram illustrating a schematic configuration of a master-pressure control device of the brake control device illustrated in FIG. 1.

Next, referring to FIG. 2, an example of an electronic control circuit configuration of the master-pressure control device 3 is described. In FIG. 2, an electronic control circuit of the master-pressure control device 3 is indicated by a heavy-line frame 201, whereas electric components and an electric circuit of the master-pressure control mechanism 4 are indicated by a dotted-line frame 202. The wheel-pressure control device 5 is indicated by a heavy-line frame. A dotted-line frame 208 indicates the sensors of the brake operation-amount detection device 8. Although the brake operation-amount detection device 8 has a configuration including two displacement sensors 8a and 8b in the example illustrated in FIG. 2, any configuration may be used as long as at least one displacement sensor is included. As described above, besides the displacement sensors, the pedaling-force sensor or the master-pressure sensor may be used to detect the brake operation amount. Moreover, at least two of the above-mentioned different sensors may be used in combination.

In the electric circuit surrounded by the heavy-line frame 201, electric power supplied from a line of the vehicle power source E through an ECU power-supply relay 214 is input to a 5V power-supply circuit 215 (hereinafter referred to as "first power-supply circuit 215") and a 5V power-supply circuit 216 (hereinafter referred to as "second power-supply circuit 216"). The ECU power-supply relay 214 is configured so as to be turned ON by any one of a seizing signal from the exterior and a seizing signal generated by the reception through a CAN in a CAN communication I/F circuit 218a. As the seizing signals, a door-switch signal, a brake-switch signal, an ignition-switch signal, or the like can be used. When a plurality of the above-mentioned seizing signals are used, the circuit may be configured so that all the seizing signals are fetched into the master-pressure control device 3 and the seizing signal actuates to turn the ECU power-supply relay 214 ON when any one of the switches for the plurality of signals is turned ON. In the case of a hybrid car or an electric car, the ignition switch is a start/stop switch, and the ignition switch signal is a Ready ON signal or a Ready OFF signal.

In a case of a failure of the vehicle power source E, the electric power supplied from the auxiliary power source 12 through an auxiliary power-supply relay 236 can be supplied to the first power-supply circuit 215 and the second power-supply circuit 216. A stable power supply (VCC1) obtained by the first power-supply circuit 215 is supplied to a central control circuit (CPU) 211. A stable power supply (VCC2) obtained by the second power-supply circuit 216 is supplied to a monitoring control circuit 219.

A fail-safe relay circuit 213 can interrupt the electric power supplied through the line of the vehicle power source E to a three-phase motor driving circuit 222. The supply and the interruption of the electric power to the three-phase motor driving circuit 222 can be controlled by the CPU 211 and the monitoring control circuit 219.

In a case of a failure of the vehicle power source E, the electric power can be supplied from the auxiliary power source 12 through an auxiliary power-supply relay 235 to the three-phase motor driving circuit 222. After noise is removed through a filter circuit 212 from the electric power supplied from the exterior, the electric power is supplied to the three-phase motor driving circuit 222.

A method of performing switching to the electric power supply from the auxiliary power source 12 in a case of a failure of the vehicle power source E is described. The failure of the vehicle power source E herein means that the electric power cannot be supplied from the vehicle power source E to the electric equipment and the electronic control devices mounted in the vehicle due to a failure of the vehicle battery or a failure of the vehicle power-generator, and in a case of hybrid automobiles and electric automobiles, due to a failure of the motor generator, a failure of the high-voltage battery, a failure of the DC/DC converter, a failure of the low-voltage battery, or the like.

For the detection of a failure of the vehicle power source E, a voltage of the power supply line from the vehicle power source E is first monitored. When the monitored voltage becomes equal to or lower than a predetermined voltage, the occurrence of a failure of the power source is determined. When the failure of the vehicle power source E is detected in this manner, the auxiliary power-supply relays 235 and 236, which are normally in an OFF state, are turned ON. As a result, the electric power can be supplied from the auxiliary power source 12. When the auxiliary power-supply relays 235 and 236 are turned ON based on the detection of the failure of the vehicle power source E, it is desired to turn OFF the ECU power-supply relay 214 and the fail-safe relay circuit 213. The reason is as follows. When a factor of the failure of the vehicle power source E is a short-circuit failure of any part of a system of the vehicle power source E to a GND such as a vehicle body, the electric power of the auxiliary power source 12 is disadvantageously consumed until a fuse located upstream of the portion where the short-circuit occurs is blown. Further, the circuit may be configured so that a diode is provided upstream or downstream of the ECU power-supply relay 214 and the fail-safe relay circuit 213 and an anode of the diode is located on the vehicle power source E side.

Vehicle information from the exterior of the master-pressure control device 3 and the control signals such as the automatic-braking request fluid pressure are input to the CPU 211 through the CAN communication I/F circuit 218a. The outputs from the rotational-position sensor 205, a motor-temperature sensor 206, the displacement sensors 8a and 8b, and the master-pressure sensor 57, which are provided on the side of the master-pressure control mechanism 4, are input to the CPU 211 through a rotational-position sensor I/F circuit 225, a motor-temperature sensor I/F circuit 226, displacement sensor I/F circuits 227 and 228, and a master-pressure sensor I/F circuit 229.

The control signal from an external device and the current detection values of the respective sensors are input to the CPU 211. The CPU 211 outputs an appropriate signal to the three-phase motor driving circuit 222 based on the input signal and values, thereby controlling the electric motor 20 of the master-pressure control device 4. An output end of the three-phase motor driving circuit 222 is connected to the electric motor 20 included in the master-pressure control mechanism 4. The three-phase motor driving circuit 222 is controlled by the CPU 211 to convert DC power into AC power so as to drive the electric motor 20. In this case, a phase-current monitoring circuit 223 and a phase-voltage monitoring circuit 224 are provided for each phase of a three-phase output of the three-phase motor driving circuit 222. A phase current is monitored by the phase-current monitoring circuit 223, whereas a phase voltage is monitored by the phase-voltage monitoring circuit 224. Based on the above-mentioned information, the CPU 211 controls the three-phase motor driving circuit 222 so as to appropriately operate the electric motor 20 included in the master-pressure control mechanism 4. When each of the monitored values of the phase-voltage monitoring circuit 224 deviates from a normal range or when the control is not performed as directed by the control command, the occurrence of a failure is determined.

The electric circuit 201 of the master-pressure control device 3 includes a storage circuit 230 formed of an EEPROM which stores, for example, failure information. The signal is transmitted and received between the storage circuit 230 and the CPU 211. The CPU 211 stores the detected failure information and learning values used for the control of the master-pressure control mechanism 4, for example, a control gain, offset values of various sensors, and the like, in the storage circuit 230. The electric circuit 201 of the master-pressure control device 3 also includes the monitoring control circuit 219 with which the CPU 211 performs the transmission and reception of the signal. The monitoring control circuit 219 monitors a failure of the CPU 211, the VCC1 voltage, and the like. When an abnormality of the CPU 211 or the VCC1 voltage is detected, the fail-safe relay circuit 213 is quickly operated to interrupt the electric power supply to the three-phase motor driving circuit 222. The monitoring control circuit 219 and the VCC2 voltage are monitored by the CPU 211.

In this embodiment, the auxiliary power-supply relays 235 and 236 are provided in the master-pressure control device 3 so that the electric power supply from the vehicle power source E and the electric power supply from the auxiliary power source 12 are switched inside the master-pressure control device 3. However, the electric power supply from the vehicle power source E and the electric power supply from the auxiliary power source 12 may be switched by a power-supply control device on the vehicle side so that only the line from the vehicle power source E illustrated in FIG. 2 is used as the electric power supply line to the master-pressure control device 3.

Figure 3:
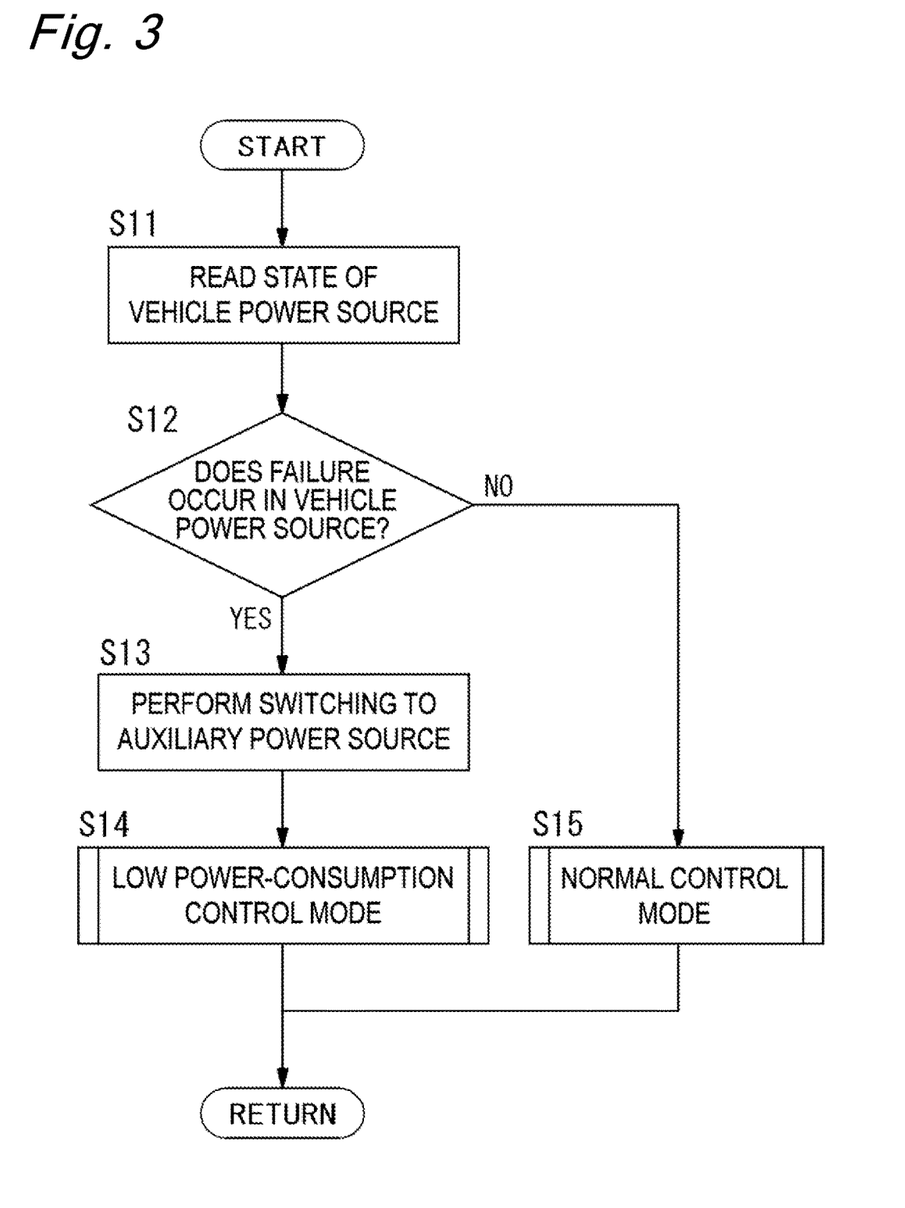
FIG. 3 is a flowchart illustrating actuation-mode switching control in a case of a power-source failure of the brake control device illustrated in FIG. 1.
Figure 4:
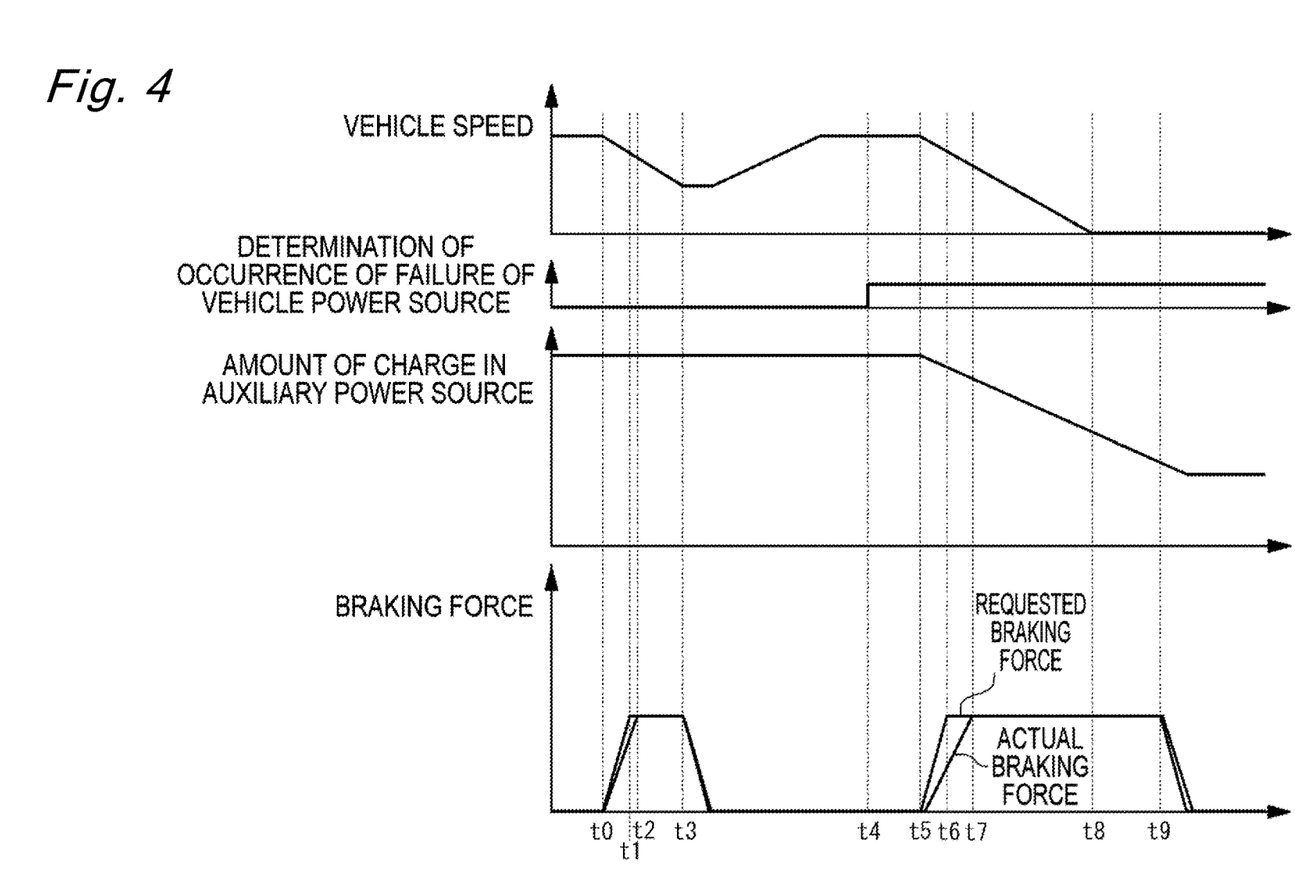
FIG. 4 is a timing chart illustrating an example of an actuation state of the brake control device illustrated in FIG. 1.

Next, control for switching a control mode in a case of a failure of the vehicle power source E in the brake control device 1 is described mainly referring to FIGS. 3 and 4. An example of a flowchart for a logic of switching the control mode is illustrated in FIG. 3. Referring to FIG. 3, in Step S11, a state of the vehicle power source E is monitored. Then, in Step S12, whether or not a failure of the vehicle power source E occurs is determined. As a method of monitoring the state of the vehicle power source E so as to determine whether or not a failure of the vehicle power source E occurs, the voltage of the electric power supply line from the vehicle power source E is monitored. Then, when the monitored voltage is equal to or lower than a predetermined value, the occurrence of a failure of the vehicle power source E is determined.

However, when only one system of the electric power supply line from the vehicle power source E is monitored, there is a fear in that the occurrence of a failure of the vehicle power source E is erroneously determined even though the monitored line is disconnected or a failure occurs in the monitoring circuit. Therefore, the failure of the vehicle power source E is more easily identified when the voltages of the two systems of the electric power supply lines from the vehicle power source E, that is, in the case of the circuit configuration illustrated in FIG. 2, the voltages of the electric power supply lines from the vehicle power source E for the ECU power-supply relay 214 and the fail-safe relay circuit 213 are monitored so that the occurrence of a failure of the vehicle power source E is determined when the monitored voltages are both equal to or lower than the predetermined voltage. Moreover, when an earth fault of the electric power supply line from the vehicle power source E is to be distinctively determined, a current through the electric power supply line from the vehicle power source E may be monitored so as to distinctively determine the occurrence of an earth fault of the electric power supply line when a large current flows on the vehicle power source E side.

When it is determined in Step S12 that a failure does not occur in the vehicle power source E, that is, when it is determined that the vehicle power source E is normal, and therefore the electric power is supplied from the vehicle power source E, the control is performed in a normal control mode in Step S15. In the normal control mode set in Step S15, the normal functions of the master-pressure control device 3 are continued and the driving current of the electric motor 20 is controlled so as to generate the braking force requested by the driver, which is calculated based on the brake operation amount detected by the brake operation-amount detection device 8.

When it is determined in Step S12 that the vehicle power source E fails, the electric power supply is switched to that from the auxiliary power source 12 in Step S13. As a method of switching the electric power supply to that from the auxiliary power source 12 based on the detection of the failure of the vehicle power source E, the auxiliary power-supply relays 235 and 236, which are in the OFF state, are turned ON to supply the electric power from the auxiliary power source 12 in the case of the circuit configuration of FIG. 2. It is desired to turn OFF the ECU power-supply relay 214 and the fail-safe relay circuit 213 when (immediately before) the auxiliary power-supply relays 235 and 236 are turned ON based on the detection of the failure of the vehicle power source E. The reason is as follows. When the earth fault occurs in any part of the system of the vehicle power source E, the electric power of the auxiliary power source 12 is disadvantageously consumed until the fuse of the vehicle located upstream of the portion where the earth fault occurs is blown. After the switching to the electric power supply from the auxiliary power source 12 is performed in Step S13, the control mode is switched to a low power-consumption control mode in Step S14.

In the low power-consumption control mode set in Step S14, the driving current of the electric motor 20 is limited. A limit value of the driving current of the electric motor 20 is set to a value smaller than that in the normal control mode as long as, for example, a predetermined braking force is ensured. By limiting the driving current of the electric motor 20 as described above, a maximum fluid pressure generated by the driving force of the electric motor 20 is smaller than that during a normal operation as a backup brake function in a case of a failure of the vehicle power source E. However, the electric power supply from the auxiliary power source 12 can be maintained.

Alternatively, a method of limiting a target braking force or a target fluid pressure may also be used as the low power-consumption control mode. In this case, however, the maximum fluid pressure generated by the driving force of the electric motor 20 is set smaller than that during the normal operation to reduce current consumption as the backup brake function in a case of a failure of the vehicle power source E. Therefore, the current consumption, which is used to accelerate the electric motor 20 until the braking force reaches the target braking force or the fluid pressure reaches the target fluid pressure, cannot be suppressed. In comparison with the case where the above-mentioned method is used, the current consumption used to accelerate the electric motor 20 can be suppressed in the case where the method of limiting the driving current of the electric motor 20 is used. Therefore, the time at which the braking force reaches the target braking force or the fluid pressure reaches the target fluid pressure becomes later. However, the maximum fluid pressure generated by the driving force of the electric motor 20 can be increased with the smaller power consumption.

The low power-consumption control mode has been described above. For the master-pressure control device 3 and the master-pressure control mechanism 4 described referring to FIG. 1, there is a limit set to only an assist force for assisting a force for pressurizing the master cylinder 9 with the driving force of the electric motor 20, which is generated in accordance with the operation amount of the brake pedal 100 obtained through pedaling of the brake pedal 100 by the driver. Therefore, the master-cylinder fluid pressure and the braking force can be increased in accordance with the pedaling force applied on the brake pedal 100 by the driver.

FIG. 4 illustrates an example of a timing chart when the low power-consumption control mode is executed as control performed at the time of electric power supply by the auxiliary power source 12 in a case of a failure of the vehicle power source E.

Referring to FIG. 4, until a time t0, the vehicle runs at a constant vehicle speed. At the time t0, the operation of the brake pedal is started. From a time t1, the operation of the brake pedal is kept constant. The requested braking force is calculated in accordance with the operation of the brake pedal. At this point of time, the vehicle power source E is normal, and therefore the control is performed in the normal control mode. Thus, an actual braking force is generated with a small response delay with respect to the requested braking force. As a result, the actual braking force is kept constant at a time t2. The brake pedal 100 is returned to stop braking at a time t3. Then, the requested braking force is calculated so as to become zero in accordance with the operation of the brake pedal. As a result, the actual braking force gradually becomes zero.

When the failure occurs in the vehicle power source E and the occurrence of the failure of the vehicle power source E is determined at a time t4, the electric power supply is switched to that from the auxiliary power source 12 so that the operation mode is switched to the low power-consumption control mode. At a time t5, the operation of the brake pedal is started. From a time t6, the operation of the brake pedal is kept constant. The requested braking force is calculated in accordance with the operation of the brake pedal. At this point of time, the control is performed in the low power-consumption control mode, and therefore the maximum driving current of the electric motor 20 is limited. Therefore, the responsiveness of the actual braking force to the requested braking force becomes lower than that in the normal control mode. However, the requested braking force in this case is smaller than the maximum braking force which can be generated by driving the electric motor 20 with a current limit value set in the low power-consumption control mode. Therefore, the actual braking force, which is equal to the requested braking force, can be generated. At a time t7, the actual braking force is kept constant. At a time t8, the vehicle speed becomes zero, that is, the vehicle is placed in a stop state. The driver stops the operation of the brake pedal at a time t9.

From the time t5 to the time t9, the master-pressure control device 3 is driven by the electric power supply from the auxiliary power source 12. However, the master-pressure control device 3 is driven in the low power-consumption control mode. Therefore, the power consumption of the auxiliary power source 12 becomes smaller than that in the case where the master-pressure control device 3 is driven in the normal control mode. Therefore, the electric power supply from the auxiliary power source 12 can be maintained. Although the electric power is reduced by the amount of electric power consumed by the electronic circuit from the time t4 to the time t5, the power consumption is smaller as compared with the case where the electric motor 20 is driven. Therefore, a reduction in the amount of charge of the auxiliary power source 12 is not illustrated.

Next, description is given of first to third embodiments of the present invention for executing power-supply interruption control for interrupting the connection to the vehicle power source E and continuing the brake control with the auxiliary power source 12 when predetermined system end conditions are satisfied. Here, the predetermined system end conditions are as follows. Specifically, the ignition switch is in an OFF state, and no possibility of the braking operation through the operation of the brake pedal 100 by the driver is conceived. The system end conditions can be determined based on the satisfaction of the conditions of, for example, the release of the brake pedal, the closure of the door, the locking of the door, the actuation of a parking brake, and the generation of no seizing signal as well as the OFF state of the ignition switch. Alternatively, the system end conditions may be determined based on the satisfaction of the combination of a plurality of the conditions described above. Further alternatively, the elapse of a predetermined period of time may be used as a condition for determining the satisfaction of the system end conditions after the satisfaction of the conditions described above. When the ECU power-supply relay 214 is turned ON by the seizing signal during the execution of the power-supply interruption control, the brake control system 1, which is supplied with necessary electric power from the vehicle power source E, is started.

Figure 5:
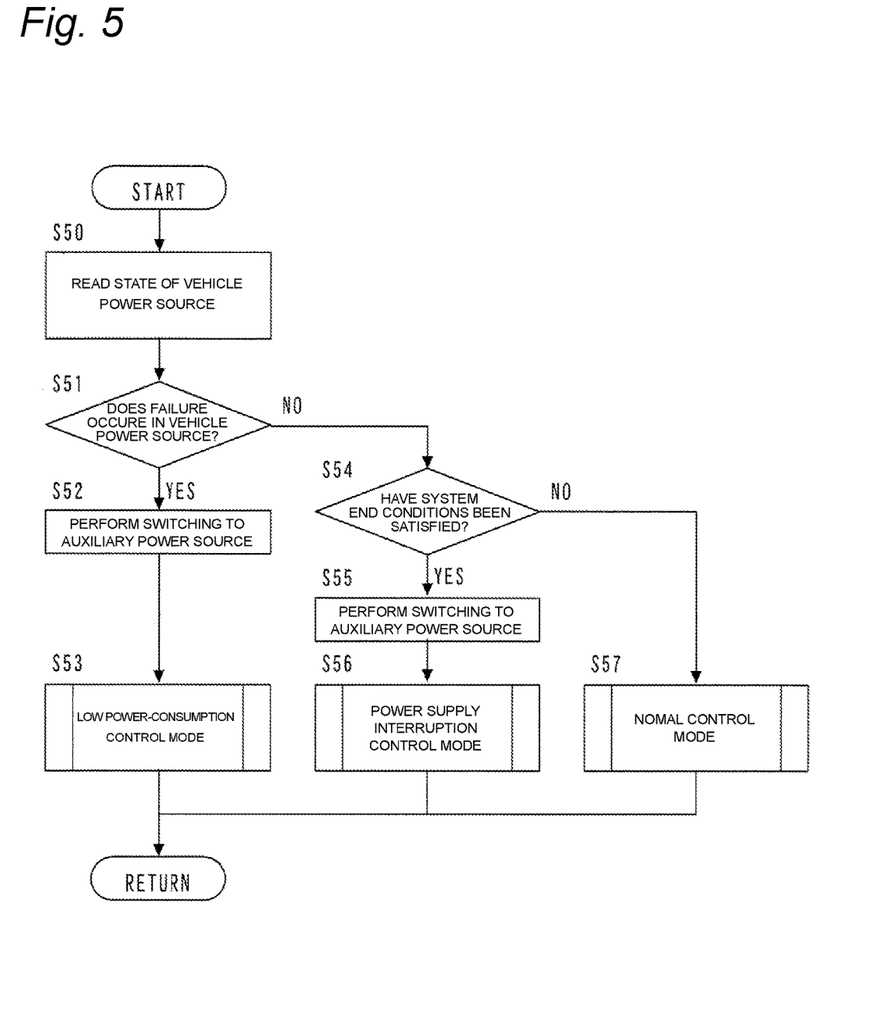
FIG. 5 is a flowchart illustrating control in a case of power-supply interruption of the brake control device illustrated in FIG. 1 according to a first embodiment of the present invention.

The first embodiment is described referring mainly to FIG. 5.

In the first embodiment, when the system end conditions are satisfied, the power-supply interruption control is executed to interrupt the vehicle power source E and supply the necessary electric power from the auxiliary power source 12. In this manner, the power-supply interruption control is continued by the master-pressure control device 3 until the electric power stored in the auxiliary power source 12 is depleted.

An example of a control flow for executing the power-supply interruption control according to this embodiment is illustrated in FIG. 5. Referring to FIG. 5, in Steps S50 to S53, the same processing as that performed in Steps S11 to S14 illustrated in FIG. 3 is performed. Then, when it is determined in Step 51 that the vehicle power source E does not fail, that is, when it is determined that the vehicle power source E is normal and the electric power is supplied from the vehicle electric power source E, the processing proceed to Step S54. In Step S54, it is determined whether or not the system end conditions have been satisfied. Then, when the system end conditions have not been satisfied, the processing proceeds to Step S57. In Step S57, the control is performed in the normal control mode.

On the other hand, in Step S54 when the system end conditions have been satisfied, the power source is switched from the vehicle power source E to the auxiliary power source 12 in Step S55 so as to continue the control in a power-supply interruption control mode with the auxiliary power source 12. More specifically, in Step S55, the ECU power-supply relay 214 and the fail-safe relay circuit 213 are turned OFF to interrupt the vehicle power source E, and then, the auxiliary power-supply relay 236 is turned ON to perform switching of the electric power supply to the CPU 211 and the monitoring control circuit 219 to the auxiliary power source 12. Further, in Step S56, the control is performed in the power-supply interruption control mode. In the power-supply interruption control mode, the functions of the CPU 211 and the monitoring control circuit 219 are maintained, by the electric power supply from the auxiliary power source 12, without use of the vehicle power source E, thereby the operation of the brake pedal, opening/closure of a door or the like, are monitored, and the starting position of the various sensors are stored and maintained. When the operation of the brake pedal 100 is detected, the fail-safe relay circuit 213 is turned ON so as to make the operation of the master-pressure control device 3 possible. Therefore, it is not necessary to maintain a startup state of the brake system over a long period of time by the vehicle power source E while the ignition switch is in the OFF state, and the reduction in the power consumption is made possible.

After the switching to the auxiliary power source 12, the control in the power source interruption control mode is continued until all the electric charges accumulated in the auxiliary power source 12 are used. Then, at the time at which all the electric charges of the auxiliary power source 12 are used, the power supply to the CUP 211 and the monitoring control circuit 219 is stopped to stop the power-supply interruption control. As a result, the control can be continued by using the electric charges of the auxiliary power source 12 to the maximum extent.

Figure 6:
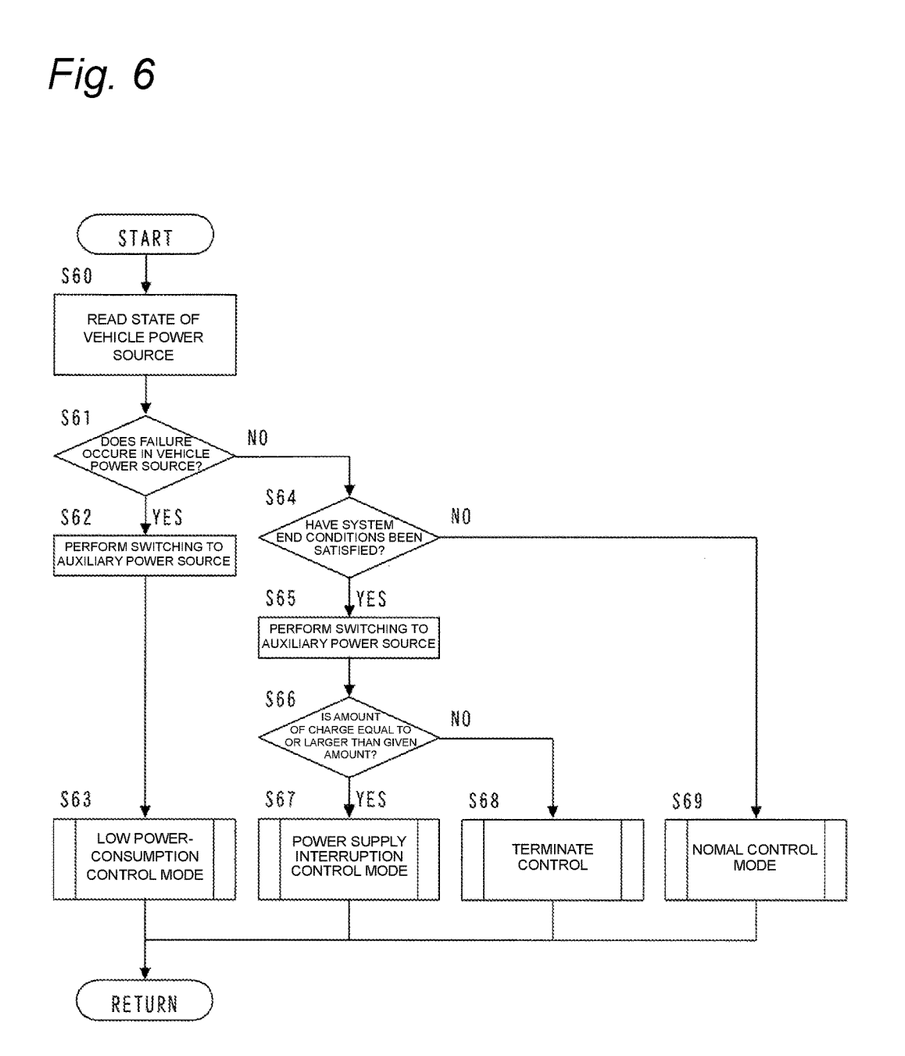
FIG. 6 is a flowchart illustrating control in a case of power-supply interruption of the brake control device illustrated in FIG. 1 according to a second embodiment of the present invention.

Next, the second embodiment is described referring mainly to FIG. 6. Detailed description is given only of the differences from the first embodiment described above.

In the second embodiment, when the system end conditions are satisfied, the power-supply interruption control is executed to interrupt the vehicle power source E and supply the necessary electric power from the auxiliary power source 12 to the CPU 211 and the monitoring control circuit 219 when the amount of electric power (amount of charge) of the auxiliary power source 12 is equal to or larger than a given amount, so as to reduce the electric power consumption. Further, when the operation of the brake pedal 100, the operation of the master-pressure control device 3 is made possible immediately.

An example of a control flow for executing the power-supply interruption control according to this embodiment is illustrated in FIG. 6. Referring to FIG. 6, in Step S64 corresponding to Step S54 of the first embodiment, when the system end conditions have been satisfied, the power source is switched from the vehicle power source E to the auxiliary power source 12 in Step S65 so as to determine the amount of charge of the auxiliary power source 12 in Step S66. When the amount of charge is equal to or larger than a given amount, the control in the power-supply interruption control mode as in the first embodiment is performed in Step S67. On the other hand, in Step S66 when the amount of charge is smaller than the given amount, the control in the power-supply interruption control mode is terminated in Step S68. The amount of charge of the auxiliary power source 12 can be determined based on the voltage of the auxiliary power-supply line.

Figure 7:
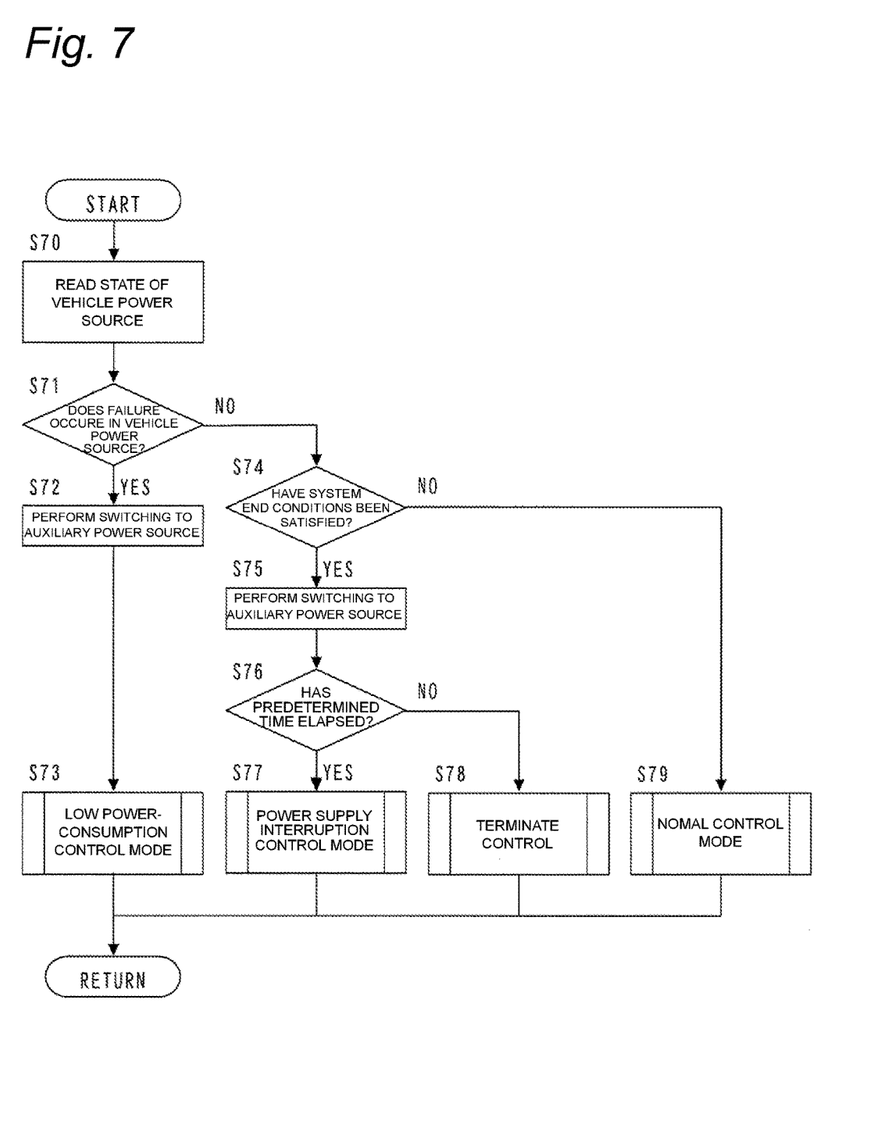
FIG. 7 is a flowchart illustrating control in a case of power-supply interruption of the brake control device illustrated in FIG. 1 according to a third embodiment of the present invention.

Next, the third embodiment is described referring mainly to FIG. 7. Detailed description is given only of the differences from the first embodiment described above.

In the third embodiment, when the system end conditions are satisfied, the power-supply interruption control is executed to interrupt the vehicle power source E and supply the necessary electric power from the auxiliary power source 12 to the CPU 211 and the monitoring control circuit 219. In this manner, the electric power consumption is reduced for a predetermined period of time and, when the operation of the brake pedal 100 is detected, the master-pressure control device 3 can operate immediately.

An example of a control flow for executing the power-supply interruption control according to this embodiment is illustrated in FIG. 7. Referring to FIG. 7, in Step S74 corresponding to Step S54 in the first embodiment, when the system end conditions have been satisfied, the power source is switched from the vehicle power source E to the auxiliary power source 12 in Step S75. In Step S76, it is determined whether or not a predetermined period of time has elapsed after the control in the power-supply interruption control mode shown in Step S77 was starter. Before the elapse of the predetermined period of time, the control mode is switched to the low power-consumption control mode to continue the control in Step S77. After the elapse of the predetermined period of time, the control in the power-supply interruption control mode is terminated in Step S78.

In the above-mentioned manner, the continuation time of the control by the auxiliary power source 12 is limited. As a result, in the case where the auxiliary power source 12 may degrade by the use over a long period of time under the condition in which the auxiliary power source 12 is not charged, as in the case where the auxiliary power source 12 is a lead-acid battery, the degradation of the auxiliary power source 12 can be suppressed. The power-supply interruption control of the second embodiment and that of the third embodiment may be executed in combination.

The power-supply interruption control according to the first to third embodiments described above may be applied not only to the brake control device 1 but also similarly to an electric brake device for pressing brake pads corresponding to friction members against a disc rotor corresponding to a rotating body rotating together with wheels by an electric motor which is an electric actuator to perform braking, to a brake device for driving a hydraulic pump by the electric motor to generate a brake fluid pressure, and to a brake control device actuated by using an electric actuator as a driving source, such as a so-called brake-by-wire system.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-214599, filed on Sep. 29, 2011. The entire disclosure of Japanese Patent Application No. 2011-214599, filed on Sep. 29, 2011 including specification, claims, drawings and summary is incorporated herein by reference in its entirety.

What is claimed:

1. A brake control device, comprising:
an electric actuator for controlling a braking force of a brake device in a vehicle;
a controller for controlling the electric actuator to be driven by electric power supplied from a vehicle power source; and
an auxiliary power source for storing electric power when a voltage of a power supply from the vehicle power source is larger than a predetermined voltage, and for supplying electric power to the controller when it is determined that the vehicle power source fails where the voltage of the power supply from the vehicle power source becomes equal to or lower than a predetermined voltage,
wherein:
the controller is configured to execute power-supply interruption control that:
(i) interrupts a connection to the vehicle power source and continues a control for detecting operation of the brake device by a driver by the electric power supplied from the auxiliary power source when it is determined that predetermined system end conditions are satisfied based on the operation of the brake device by the driver, and
(ii) connects the electric actuator to the vehicle power source and drives the electric actuator by the electric power supplied from the vehicle power source when the operation of the brake device by the driver is detected.

2. The brake control device according to claim 1, wherein:
the controller is capable of inputting thereto an activation signal from vehicle equipment operated by the driver and a status signal of an ignition switch of the vehicle; and
the predetermined system end conditions comprise a condition of generation of an OFF signal of the ignition switch in addition to a condition of generation of the activation signal.

3. The brake control device according to claim 1, wherein the power-supply interruption control is continued until the electric power stored in the auxiliary power source is depleted.

4. The brake control device according to claim 1, wherein the power-supply interruption control is executed when an amount of the electric power stored in the auxiliary power source is equal to or larger than a given amount.

5. The brake control device according to claim 1, wherein the power-supply interruption control is continued for a predetermined period of time.

6. The brake control device according to claim 1, wherein the controller receives, from the auxiliary power source, only the electric power that is supplied to the vehicle power source, when the power-supply interruption control is executed.

7. The brake control device according to claim 1, wherein the controller stops the electric actuator when the power-supply interruption control is executed.

8. The brake control device according to claim 7, wherein the controller interrupts the connection between the electric actuator and the vehicle power source when the operation of the brake device by the driver is detected in the power-supply interruption control.

9. The brake control device according to claim 1, wherein:
the brake device comprises a hydraulic brake device actuated by a brake fluid pressure; and
the electric actuator drives a piston of a master cylinder for generating the brake fluid pressure.

10. The brake control device according to claim 1, wherein the brake device performs braking by pressing friction members against a rotating body rotating together with a wheel using the electric actuator.

11. A brake control device, comprising:
a master-pressure control mechanism for generating, by an electric actuator, a brake fluid pressure to be supplied to a brake device in a vehicle; and
a controller for controlling the master-pressure control mechanism based on an operation amount of a brake pedal in the vehicle and an actuation state of the electric actuator,
a vehicle power source connected to the controller, the vehicle power source being configured to drive the electric actuator, and
an auxiliary power source connected to the controller, the auxiliary power source being configured to supply electric power to the controller when it is determined that the vehicle power source is in a failure state in which a voltage of a power supply from the vehicle power source becomes equal to or lower than a predetermined voltage,
wherein the controller is configured to execute power-supply interruption control that:
(i) interrupts a connection to the vehicle power source and detects operation of the brake pedal by the electric power supplied from the auxiliary power source, when it is determined that predetermined system end conditions are satisfied based on the operation of the brake pedal by a driver, and
(ii) connects the electric actuator to the vehicle power source and drives the electric actuator by the electric power supplied from the vehicle power source when the operation of the brake pedal by the driver is detected.

12. The brake control device according to claim 11, wherein:
the controller is capable of inputting an activation signal from vehicle equipment operated by the driver and a status signal of an ignition switch of the vehicle; and
the predetermined system end conditions comprise a condition of generation of an OFF signal of the ignition switch in addition to a condition of generation of the activation signal.

13. The brake control device according to claim 11, wherein the power-supply interruption control is continued until electric power stored in the auxiliary power source is depleted.

14. The brake control device according to claim 11, wherein the power-supply interruption control is executed when an amount of electric power stored in the auxiliary power source is equal to or larger than a given amount.

15. The brake control device according to claim 11, wherein the power-supply interruption control is continued for a predetermined period of time.

16. The brake control device according to claim 11, wherein the controller receives, from the auxiliary power source, only the electric power that is supplied to the controller, when the power-supply interruption control is executed.

17. A brake control device, comprising:
a master-pressure control mechanism for generating, by an electric actuator, a brake fluid pressure to be supplied to a brake device in a vehicle; and a controller for controlling the master-pressure control mechanism based on an operation amount of a brake pedal in the vehicle and an actuation state of the electric actuator, wherein:

the controller is connected to a vehicle power source for driving the electric actuator and an auxiliary power source;

the controller comprises a power-source failure detection section for monitoring a voltage of the vehicle power source to detect a failure of the vehicle power source;

the controller is configured to execute power-supply interruption control for continuing the control of the master-pressure control mechanism by electric power supplied from the auxiliary power source, after interrupting a connection to the vehicle power source that is in a failure state when the failure of the vehicle power source is detected by the power-source failure detection section; and the controller is configured to execute power-supply interruption control for detecting operation of the brake pedal by the electric power supplied from the auxiliary power source, after interrupting the connection to the vehicle power source when predetermined system end conditions are satisfied based on the operation of the brake pedal by a driver without detecting failure of the vehicle power source.

18. The brake control device according to claim 17, wherein:

the controller is capable of inputting thereto an activation signal from vehicle equipment operated by the driver and a status signal of an ignition switch of the vehicle; and the predetermined system end conditions comprise a condition of generation of an OFF signal of the ignition switch in addition to a condition of generation of the activation signal.

19. The brake control device according to claim 17, wherein the power-supply interruption control is continued until electric power stored in the auxiliary power source is depleted.

20. The brake control device according to claim 17, wherein the controller receives, from the auxiliary power source, only the electric power that is supplied to the controller, when the power-supply interruption control is executed.

* * * * *